United States Patent
Kawamura et al.

(10) Patent No.: US 6,408,350 B1
(45) Date of Patent: Jun. 18, 2002

(54) APPARATUS AND METHOD FOR INTERCONNECTING DEVICES HAVING DIFFERENT COMMUNICATION FORMATS

(75) Inventors: Harumi Kawamura, Tokyo; Yasuhiro Takada, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/237,930

(22) Filed: Jan. 27, 1999

(30) Foreign Application Priority Data

Jan. 28, 1998 (JP) .......................................... 10-015212

(51) Int. Cl.$^7$ .............................................. G06F 13/12
(52) U.S. Cl. ........................... 710/62; 710/72; 709/200; 709/238
(58) Field of Search ...................... 710/62, 5, 9, 33–47, 710/65, 64, 72–74; 709/238, 246, 251, 200

(56) References Cited

U.S. PATENT DOCUMENTS

| | | | |
|---|---|---|---|
| 4,703,059 A | * 10/1987 | Rumbolt et al. | 358/194.1 |
| 5,121,113 A | * 6/1992 | Kedge et al. | 340/712 |
| 5,237,659 A | * 8/1993 | Takats | 709/200 |
| 5,537,626 A | * 7/1996 | Kranslavsky et al. | 710/8 |
| 5,694,580 A | * 12/1997 | Narita et al. | 395/500 |
| 5,852,825 A | * 12/1998 | Winslow | 707/6 |
| 5,887,193 A | * 3/1999 | Takahashi et al. | 710/8 |
| 6,011,790 A | * 1/2000 | Fisher | 370/349 |
| 6,166,826 A | * 12/2000 | Yokoyama | 358/1.16 |
| 6,182,084 B1 | * 1/2001 | Cockrell et al. | 707/104 |
| 6,240,441 B1 | * 5/2001 | Beckett et al. | 709/200 |

FOREIGN PATENT DOCUMENTS

| | | |
|---|---|---|
| EP | 0637157 | 2/1995 |
| EP | 0719016 | 6/1996 |

* cited by examiner

Primary Examiner—Jeffrey Gaffin
Assistant Examiner—Ri Jue Mai
(74) Attorney, Agent, or Firm—Jay H. Maioli

(57) ABSTRACT

An apparatus and method for converting the format of data to be transmitted into an appropriate form and for transmitting the data to a data receiving apparatus when the data receiving apparatus does not support a data format which can be output by a data transmission apparatus on a network. A controller acquires information of a data format which can be transmitted by a source apparatus and a data format which can be received by a destination apparatus. When the destination apparatus cannot receive the data format which can be transmitted by the source apparatus, the controller instructs the source apparatus to transmit data to the controller. The controller receiving the data converts the data format into a format in which the data can be received by the destination apparatus, and transmits the data to the destination apparatus.

5 Claims, 6 Drawing Sheets

APPARATUS AND METHOD FOR INTERCONNECTING DEVICES HAVING DIFFERENT COMMUNICATION FORMATS

BACKGROUND OF THE INVENTION

1. Field of the Invention

The present invention relates to a network in which a plurality of electronic apparatuses are connected by a bus, such as a high-speed serial bus conforming to IEEE1394 (hereinafter referred to as an IEEE1394 bus) and communications are performed among the electronic apparatuses. More particularly, the present invention relates to an apparatus and method for solving the problem of incompatibility of transmission data formats, which may occur between a transmission-side apparatus and a receiving-side apparatus when data is transmitted.

2. Description of the Related Art

A network has been conceived in which electronic apparatuses (hereinafter referred to as apparatuses), such as digital video cassette recorders, digital still cameras, personal computers, and printers, are connected through an IEEE1394 bus, and communications are performed among these apparatuses.

In a network in which a plurality of such apparatuses are connected by an IEEE1394 bus (hereinafter referred to as an IEEE1394 network), transmission of data and control signals is performed by time division multiplexing at a predetermined communication cycle. As communication configurations in one communication cycle, there are isochronous (hereinafter referred to as Iso) communication in which video data, audio data, and the like are transmitted in real time, and asynchronous (hereinafter referred to as Async) communication in which a control signal, such as an operation control command and a connection control command of an apparatus, is transmitted at non-fixed intervals as required.

When a print data supply apparatus on an IEEE1394 network transmits print data to a printer apparatus and instructs printing, it is necessary for the print data supply apparatus to provide and transmit data conforming to a data format which can be received and printed by a printer apparatus.

The print data supply apparatus must change the format of print data to be transmitted depending upon the printer apparatus of a print data transmission destination. In a case where a plurality of print data supply apparatuses are connected on the network, all of these apparatuses need to have a print data format conversion function, with the result that the same function is present at a plurality of places on the network and the resources are wasted.

Also, when the print data supply apparatus cannot transmit data conforming to a data format which can be received and printed by the printer apparatus, the problem that the printer apparatus cannot print specified data occurs.

SUMMARY OF THE INVENTION

An object of the present invention, which has been achieved in view of such situations, is to provide an apparatus and method for converting the format of data to be transmitted into an appropriate form and transmitting the data to a receiving apparatus in a case where a data transmission apparatus and the data receiving apparatus are connected on an IEEE1394 network and the data receiving apparatus is not designed to support the data format which can be output by the data transmission apparatus.

According to a first aspect, the present invention which achieves this object relates to an electronic apparatus on a communication network comprising a bus and a plurality of electronic apparatuses connected to the bus, the electronic apparatus comprising: means for checking functions implemented by at least a first electronic apparatus and a second electronic apparatus on the network; first determination means for determining whether a data format which can be transmitted by the first electronic apparatus can be received by the second electronic apparatus on the basis of the functions implemented by the first electronic apparatus and the second electronic apparatus; and control means for performing control so that data is transmitted from the first electronic apparatus to the second electronic apparatus when it is determined by the first determination means that the data format which can be transmitted by the first electronic apparatus can be received by the second electronic apparatus.

According to a second aspect, the present invention which achieves this object relates to an electronic apparatus further comprising: holding means for holding information of a convertible data format; second determination means for determining whether a data format which can be transmitted the first electronic apparatus can be converted into a format which can be received by the second electronic apparatus on the basis of the information of the data format; and data format conversion means for converting the data format which can be transmitted by the first electronic apparatus into a format which can be received by the second electronic apparatus when the first determination means determines that the data format which can be transmitted by the first electronic apparatus can be received by the second electronic apparatus and the second determination means determines that the data format which can be transmitted by the first electronic apparatus can be received by the second electronic apparatus.

According to a third aspect, the present invention which achieves this object relates to an electronic apparatus further comprising: acquisition means for acquiring information of a convertible data format in another electronic apparatus from among the plurality of electronic apparatuses; third determination means for determining whether the other electronic apparatus can convert the data format which can be transmitted by the first electronic apparatus into a format which can be received by the second electronic apparatus on the basis of the information of the convertible data format in the other electronic apparatus; and control means for controlling the other electronic apparatus so as to convert the data format which can be transmitted by the first electronic apparatus into a format which can be received by the second electronic apparatus when the first determination means determines that the data format which can be transmitted by the first electronic apparatus cannot be received by the second electronic apparatus, the second determination means determines that the data format which can be transmitted by the first electronic apparatus cannot be converted into a format which can be received by the second electronic apparatus, and the third determination means determines that the data format which can be transmitted by the first electronic apparatus can be converted into a format which can be received by the second electronic apparatus.

According to a fourth aspect, the present invention which achieves this object relates to an electronic apparatus on a communication network comprising a bus and a plurality of electronic apparatuses connected to the bus, the electronic apparatus comprising: holding means for holding information of a convertible data format; first input means for inputting control data from another electronic apparatus from among the plurality of electronic apparatuses; second input means for inputting data transmitted over the bus from the first electronic apparatus; data format conversion means for converting the data from a first data format into a second data format on the basis of the control data; and data output means for outputting the data which has been converted into the second data format.

According to a fifth aspect, the present invention which achieves this object relates to a data communication method on a communication network comprising a bus and a plurality of electronic apparatuses connected to the bus, the data communication method comprising: a step for acquiring information of a data format which can be transmitted by a source apparatus which provides data from among the plurality of apparatuses; a step for acquiring information of a data format which can be received by a destination apparatus which receives data from among the plurality of electronic apparatuses; and a step for determining whether the data format which can be transmitted by the source apparatus can be received by the destination apparatus on the basis of the information of the transmittable data format and information of the receivable data format.

According to a sixth aspect, the present invention which achieves this object relates to a data communication method further comprising: a control step for performing control so that data is transmitted from the source apparatus to the destination apparatus when the data format which can be transmitted by the source apparatus can be received by the destination apparatus.

According to a seventh aspect, the present invention which achieves this object relates to a data communication method further comprising: a step for referencing information of a convertible data format when the data format which can be transmitted by the source apparatus cannot be received by the destination apparatus; a step for determining whether the data format which can be transmitted by the source apparatus can be converted into a data format which can be received by the destination apparatus on the basis of the information of the transmittable data format and the information of the convertible data format; and a step for performing control so that when it is determined in the determination step that the data format which can be transmitted by the source apparatus can be received by the destination apparatus, the data format which can be transmitted by the source apparatus is converted into a format which can be received by the destination apparatus.

According to an eighth aspect, the present invention which achieves this object relates to a data communication method on a communication network comprising a bus and a plurality of electronic apparatuses connected to the bus, the data communication method comprising: a step for inputting control data from another electronic apparatus from among the plurality of electronic apparatuses; a data input step for inputting data transmitted over the bus from a first electronic apparatus; a data format conversion step for converting the data from a first data format into a second data format on the basis of the control data; and a data output step for outputting the data which has been converted into the second data format over the bus.

In the present invention, at a predetermined point in time, an apparatus for transmitting data on the network is defined as a source apparatus, and an apparatus for receiving and processing data is defined as a destination apparatus. Further, an apparatus for instructing and controlling an apparatus connected on the network so as to transmit data is defined as a controller, and a data format conversion function is implemented in the controller.

The transmission of data from the source apparatus to the destination apparatus is instructed by the controller. The source apparatus has, as apparatus information, a list of data formats which can be transmitted, and the destination apparatus has, as apparatus information, a list of data formats which can be received and processed.

When instructing transmission of data from the source apparatus to the destination apparatus, the controller acquires information of a data format which can be transmitted by the source apparatus and information of a data format which can be received by the destination apparatus, determines, from the information, a data format suitable for the transmission, and instructs the source apparatus to transmit data in the specified format to a destination.

When an appropriate format cannot be found, the controller determines a data format which can be transmitted by the source apparatus and a data format which can be received by the destination apparatus by referring also to data format information which can be converted by the controller itself, and instructs the source apparatus to transmit data in that data format to the controller. The controller receiving the data converts the data format into a format which can be received by the destination apparatus and transmits the data to the destination apparatus.

The above and further objects, aspects and novel features of the invention will become more apparent from the following detailed description when read in connection with the accompanying drawings.

DETAILED DESCRIPTION OF THE PREFERRED EMBODIMENT

The embodiment of the present invention will now be described below in detail with reference to the accompanying drawings.

Figure 1:
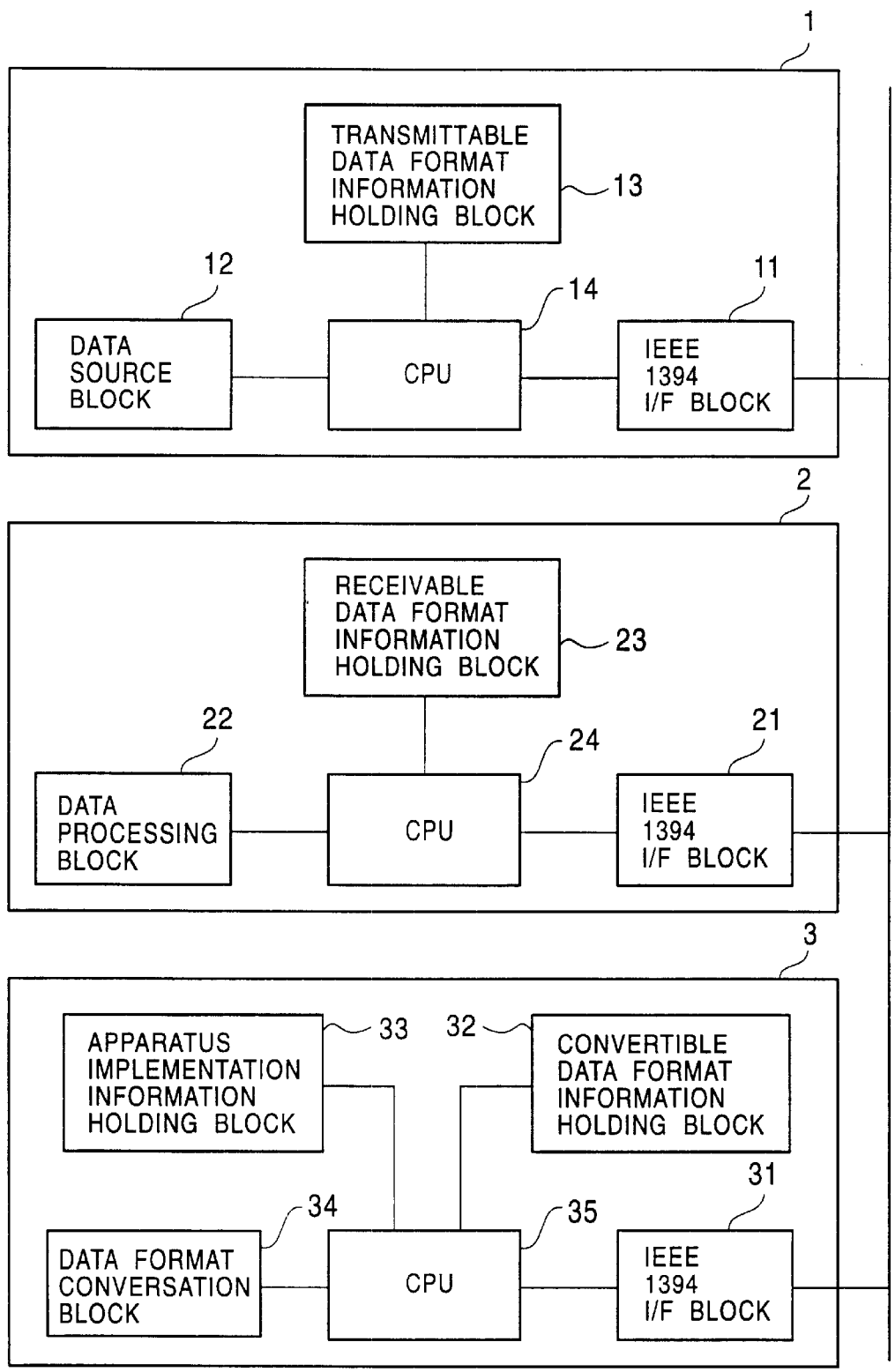
FIG. 1 is a diagram showing the construction of an IEEE1394 network of the present invention.

FIG. 1 is a diagram showing the construction of an IEEE1394 network according to the present invention. As shown in this figure, a source apparatus 1, a destination apparatus 2, and a controller (control apparatus) 3 are connected to an IEEE1394 bus 4. Each apparatus includes an IEEE1394 interface block 11, 21, or 31, which is an interface for accessing another apparatus on a network through the IEEE1394 bus 4.

An apparatus for transmitting data on an IEEE1394 network at a predetermined point in time is defined as a source apparatus. As shown in FIG. 1, the source apparatus 1 comprises, as hardware, the IEEE1394 interface block 11, a data source block 12, and a block 13 for holding information of a data format which can be transmitted, and a CPU 14.

Also, an apparatus for receiving data on the IEEE1394 network at a predetermined point in time is defined as a destination apparatus. As shown in FIG. 1, the destination apparatus 2 comprises, as hardware, an IEEE1394 interface block 21, a data processing block 22, and a block 23 for holding information of a data format which can be received, a CPU 24.

Further, an apparatus for instructing an apparatus on the IEEE1394 network to transmit data and for performing control of the apparatuses is defined as a controller. As shown in FIG. 1, the controller 3, which is an apparatus which exists as one element on the IEEE1394 network, comprises hardware for realizing the functions to be described later, that is, an IEEE1394 interface block 31, a block 32 for holding format-convertible format information, a block 33 for indicating that the apparatus has implemented a controller, a data format conversion block 34, and a CPU 35.

Next, a description is given of the structure of software of each apparatus.

The role of each apparatus will be described first. For example, the CPU 14, the CPU 24, and the CPU 35 of the source apparatus 1, the destination apparatus 2, and the controller 3 respectively have the functions of these apparatuses.

When the source apparatus receives, from an outside source, a data transmission command together with parameters, such as a data format, a data transmission destination, etc., the source apparatus begins to transmit data to the specified transmission destination in the specified format. Further, in response to a request from the outside source, the source apparatus provides information of a data format which can be transmitted.

When the reception data format is instructed from the outside source, the destination apparatus sets up a receiving buffer (a CSR space to be described later) in preparation for reception in the specified format, and receives data. Further, in response to a request from the outside source, the destination apparatus provides information of a data format which can be received.

The controller includes functions (1) to (6) described below.

(1) Function of checking functions implemented by an apparatus on the network.
(2) Function of converting a data format.
(3) Function of instructing and controlling an apparatus on the network so as to transmit data.
(4) Function of providing information of convertible data formats and providing the information in response to a request.
(5) Function of transmitting and receiving data.
(6) Function of controlling the operation of the apparatus for transmitting data and the apparatus for receiving data.

The transmission of data from the source apparatus to the destination apparatus is instructed by the controller.

Figure 2:
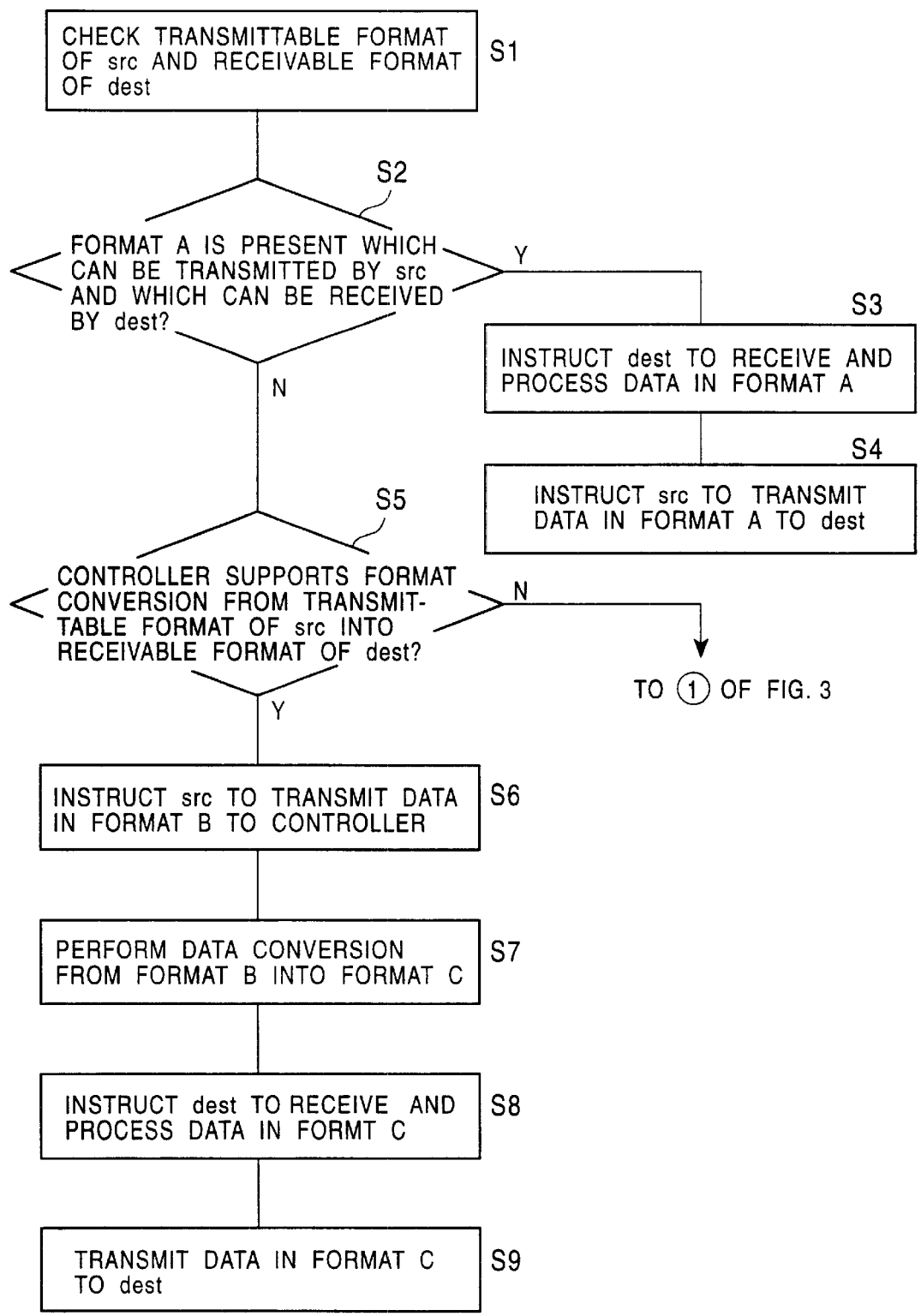
FIG. 2 shows a part of a flowchart when data is transmitted from a source apparatus to a destination apparatus.
Figure 3:
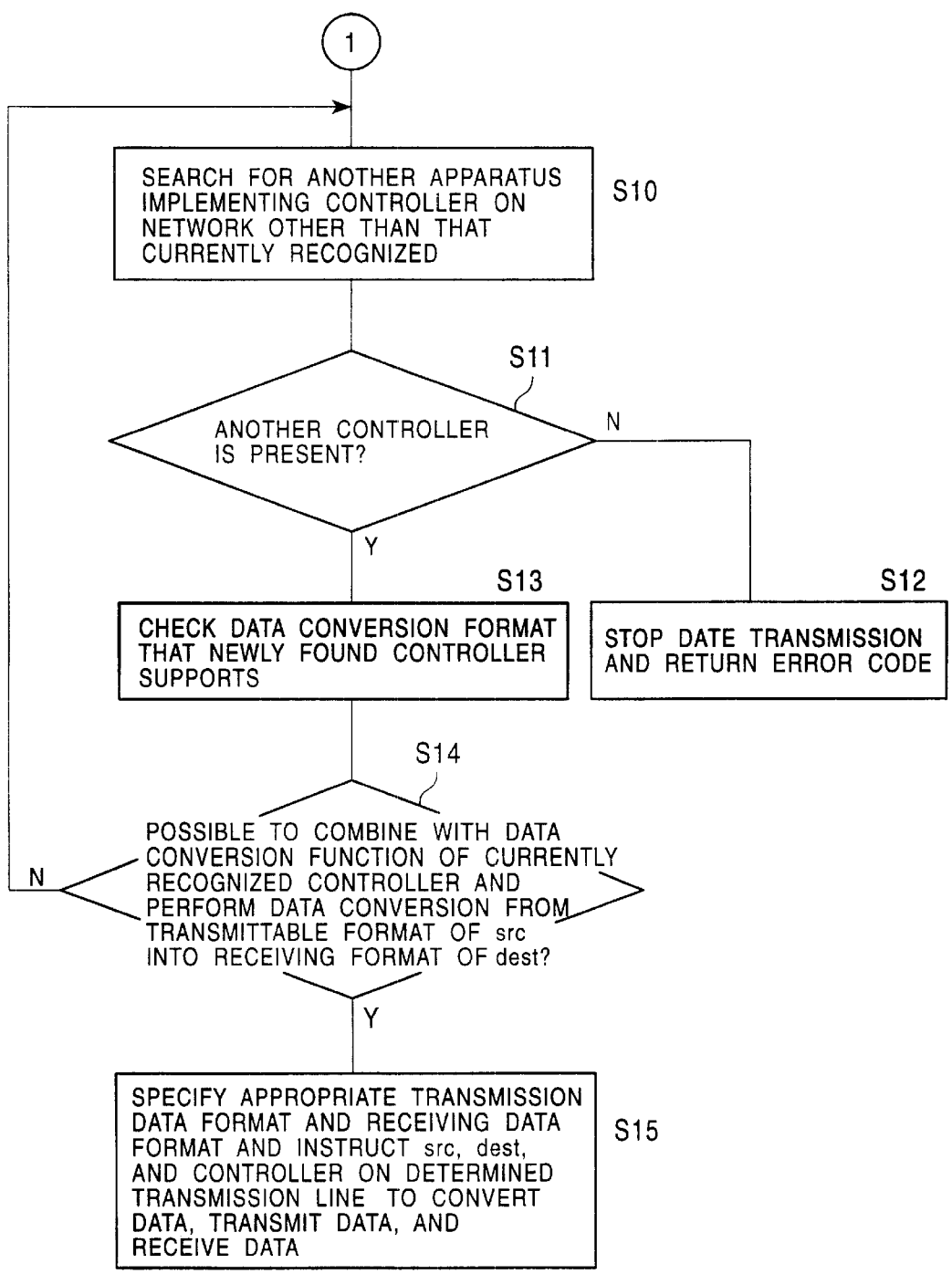
FIG. 3 shows the remaining part of the flowchart when data is transmitted from a source apparatus to a destination apparatus.

The flowchart in a case where data is actually transmitted from the source apparatus to the destination apparatus is shown in FIGS. 2 and 3. In this flowchart, SRC denotes a source apparatus, and dest denotes a destination apparatus.

Initially, when instructing transmission of data from the source apparatus to the destination apparatus, the controller acquires the information of a data format which can be transmitted by the source apparatus and a data format which can be received by the destination apparatus (step S1).

Next, it is determined whether or not a data format (denoted as format A) which can be transmitted by the source apparatus and which can be received by the destination apparatus is present (step S2). When format A is present, the controller informs the destination apparatus of the format of the data transmitted from the source apparatus and instructs the destination apparatus to receive data in the format (step S3), and instructs the source apparatus to transmit data to the destination apparatus in the applicable format (step S4).

When the applicable format A could not be found in step S2, the controller tries to convert the data format of the data to be transmitted from the source apparatus to the destination apparatus.

Specifically, a check is made first to determine whether or not the controller itself supports format conversion from the data format which can be transmitted by the source apparatus to the data format which can be received by the destination apparatus (step S5). When format conversion is supported, the controller instructs the source apparatus to transmit data to the controller in a format (denoted as format B) in which conversion is possible by the controller (step S6). The controller receiving the data converts the data format into a format (denoted as format C) in which receiving is possible by the destination apparatus (step S7) and instructs the destination apparatus to receive and process the data in format C (step S8), after which data is transmitted in format C to the destination apparatus (step S9).

When it is determined in step S5 that the controller cannot perform data conversion from the data format in which transmission is possible by the source apparatus to the data format in which receiving is possible by the destination apparatus, the controller (hereinafter referred to as a controller A) searches for another controller (hereinafter referred to as a controller B) on the network (steps S10 and S11). When the controller B is present (YES in step S11), the controller A acquires information of the format conversion table of the controller B (step S13), and checks whether or not conversion of format is possible in which data transmission is possible from the source apparatus to the destination apparatus (step S14). If the conversion of format is possible (YES in step S14), format conversion is performed by using the functions of both the controller A and the controller B or the functions of one of them, and data is transmitted from the source apparatus to the destination apparatus (step S15).

When desired format conversion cannot be performed even by using the conversion functions of the controllers A and B (NO in step S14), the controller A searches for still another controller (hereinafter referred to as a controller C) (steps S10 and S11), acquires information of a format conversion table supported by the controller C (step S13), checks whether or not desired format conversion can be performed by using the conversion functions of the controllers A, B and C (step S14), and, if possible (YES in step S14), performs format conversion (step S15).

In the above-described way, when format conversion is not possible by the controller A itself, the controller A checks whether or not format conversion is possible by using another controller.

When desired format conversion cannot be performed even by using all the controllers on the network or the number of controllers up to a limit for the implementation, the controller stops data transmission and returns an error code to the application (step S12).

Figure 4:
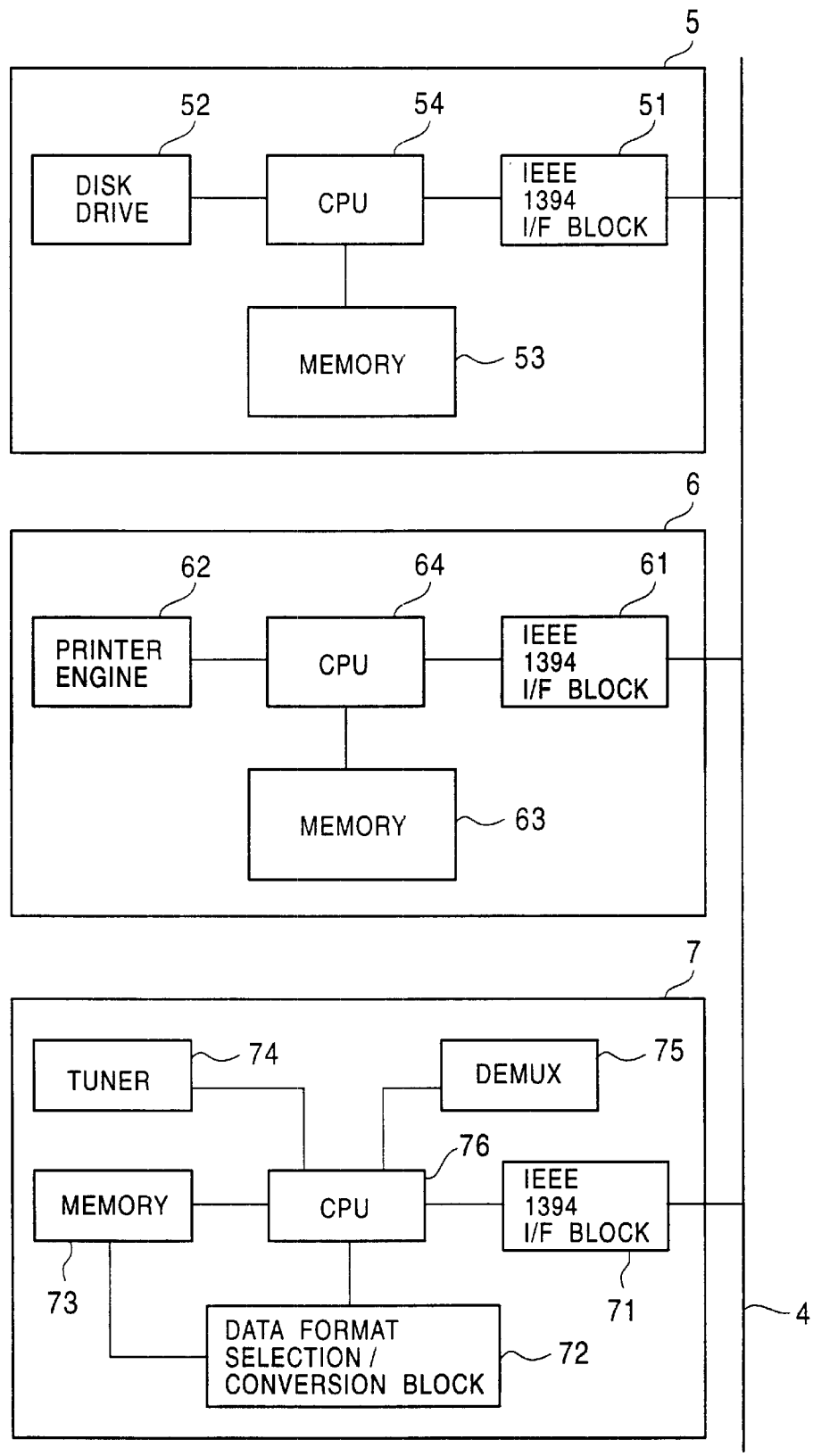
FIG. 4 is a diagram in which a disk apparatus, a printer, and an IRD Intergrated Receiver Decoder are network-connected through an IEEE1394 bus.

Next, as a specific example of the invention, a description will be given of a case in which, as shown in FIG. 4, a disk apparatus 5, a printer 6, and an IRD (Integrated Receiver Decoder) 7 are network-connected through the IEEE1394 bus 4. In this case, the disk apparatus 5 is equivalent to a source apparatus, the printer 6 is equivalent to a destination apparatus, and the IRD 7 is equivalent to a controller.

The disk apparatus 5 comprises therein an IEEE1394 interface block 51, a disk drive (recording medium) 52, a memory 53, and a CPU 54. The printer 6 comprises therein an IEEE1394 interface block 61, a printer engine 62, a memory 63, and a CPU 64. The IRD 7 comprises therein an IEEE1394 interface block 71, a data format selection/conversion block 72, a memory 73, a tuner 74, a demultiplexer 75 and a CPU 76.

A list of data formats which can be transmitted and received by each apparatus are provided as a descriptor (descriptor) defined by an AV/C digital interface command set. In the disk apparatus 5, the descriptor is implemented in the memory 53 or the disk drive 52; in the printer 6, the descriptor is implemented in the memory 63; and in the IRD 7, the descriptor is implemented in the memory 73. For the controller (in FIG. 4, the IRD), data format information which can be transmitted and received and the information of a list of format-convertible data formats are equivalent to each other.

Figure 5:
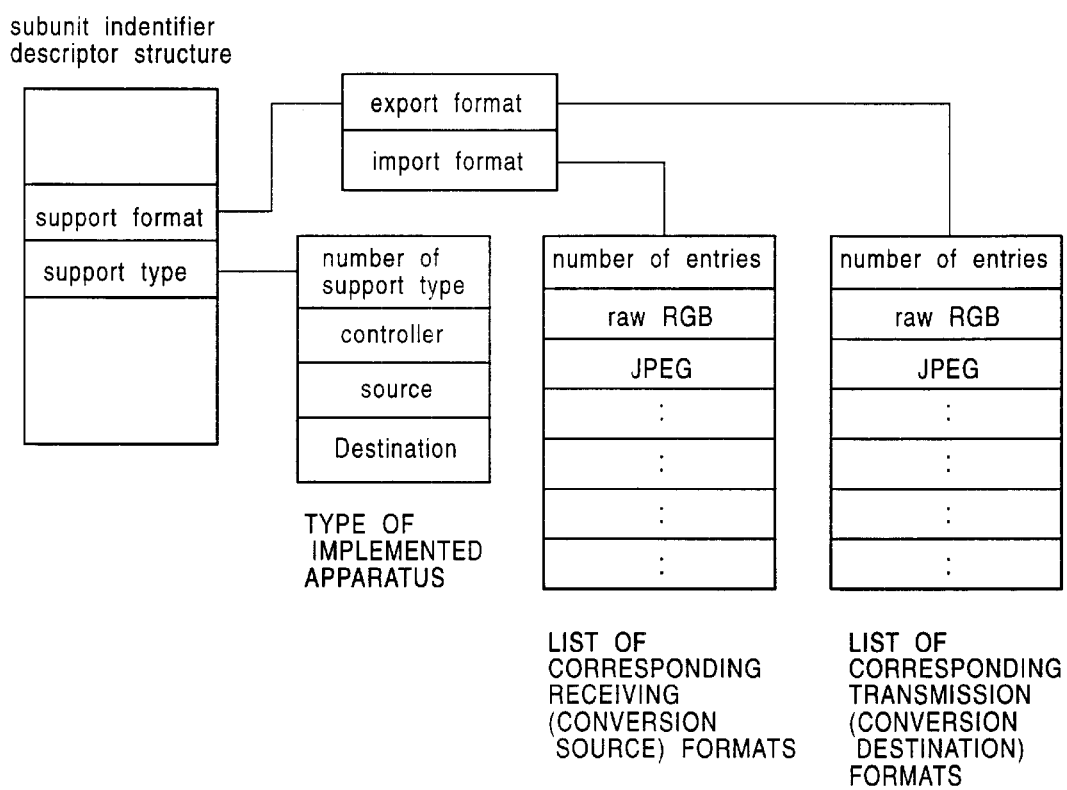
FIG. 5 is a diagram showing a model of a descriptor.

FIG. 5 shows a model of a descriptor. As shown in this figure, the descriptor has a tree structure. It is prescribed in the AV/C digital interface command set that the functions of a subunit (a function unit within the apparatus) defined by IEEE1394 be described in a subunit identifier descriptor. In this regard, apparatus information required in this embodiment included as entries of this subunit identifier descriptor is shown in FIG. 5. In this descriptor, two entries formed of support format and support type are present. Support format shows a receivable format (for the destination apparatus) or a supported format of a format conversion source (for the controller), and a transmittable format (for the source apparatus) or a supported format of a conversion source (for the controller). Support type shows which of a source/destination/controller this apparatus has implemented.

In FIG. 4, the disk apparatus 5 stores data of still images in the internal disk drive 52. The printer 6 receives and prints still image data from the 1EEE1394 bus 4. The IRD 7 has a controller implemented therein.

The disk apparatus 5, which is a source apparatus, has still image data as contents, and is able to transmit, in response to a request from an outside source, specified still image data to another apparatus over the network. When transmission of a still image is requested, the source apparatus can provide, as transmission data, image data encoded in a format supported by itself. The disk apparatus 5 has information of supported formats as a descriptor.

When the printer 6, which is a destination apparatus, receives an image format supported by itself, the printer 6 is able to have the data printed by the printer engine 62. The printer 6 has information of the supported image formats as a descriptor within the memory 63.

The IRD 7 having the controller function has the role of controlling data transmission between the source apparatus and the destination apparatus, and issuing a print request to the destination apparatus. Further, the IRD 7 has convertible data format conversion types as a descriptor within the memory 73.

For the transmission of data, Async transmission or Iso transmission is used. For the Iso transmission, a plug control register defined in IEC61883 is used to transmit data.

Figure 6:
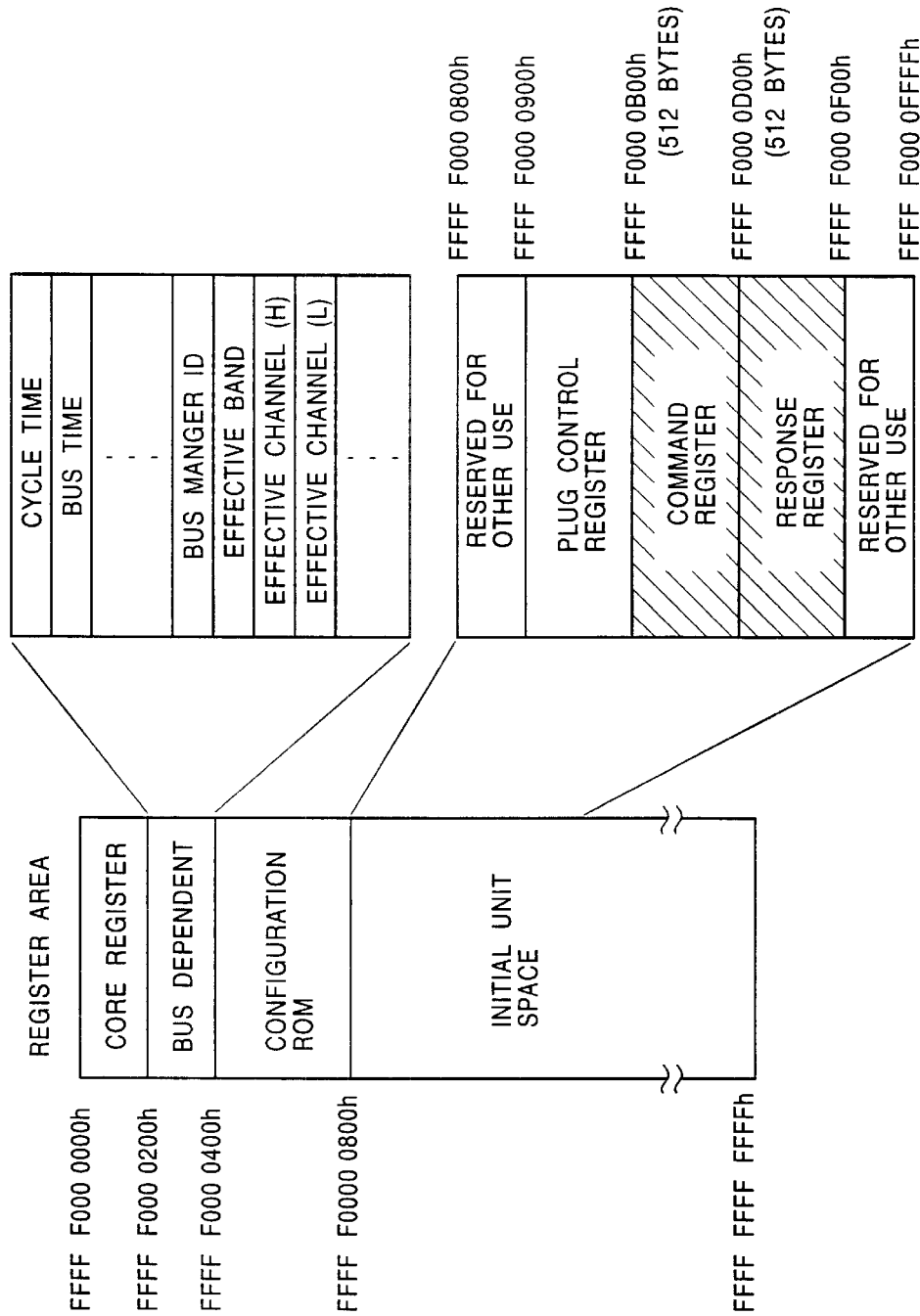
FIG. 6 is a diagram showing an example of a CSR control and status register space.

In the case of the Async transmission, a CSR (Control and Status Register) space (specifically, for example, an initial unit space shown in FIG. 6) defined in IEEE1212 is used to transmit data. Specifically, data transmission by Async transmission is realized by using techniques, such as 1), and 2) below.

1) Push model: the source apparatus writes data into the CSR space of the destination apparatus.
2) Pull model: the source apparatus provides data on the CSR space thereof, and the destination apparatus reads the CSR space on the source apparatus.

In these apparatuses, a printing operation is performed as in the following series.

Initially, the IRD 7 selects a still image to be printed from the disk apparatus 5, and at the same time, checks the image format in which transmission is supported from the descriptor of the disk apparatus 5.

Next, the IRD 7 checks the image format supported by the printer 6 from the descriptor.

The IRD 7 compares the image format supported by the disk apparatus 5 with the image format supported by the printer 6 in order to check whether there is an image format supported by both apparatuses.

When there is an image format supported by both apparatuses, the IRD 7 performs transmission of data between the disk apparatus 5 and the printer 6 in accordance with the applicable format. In the case of a pull model, the IRD 7 instructs the disk apparatus 5 to write the data of the applicable format into the specified CSR space and instructs the printer 6 to perform printing by assuming the data of the CSR space written by the disk apparatus 5 to be in the specified image format.

When, in contrast, there is no format supported by both apparatuses, the IRD 7 refers to the information of the image conversion table that it has implemented by itself within the memory 73 in order to check whether conversion is possible from the image data format supported by the disk apparatus 5 into the image data format supported by the printer 6. When conversion is possible from the image format A supported by the disk apparatus 5 into the image format B supported by the printer 6, in the case of a push model, the IRD 7 instructs the disk apparatus 5 to transmit data in format A. The transmission destination is the CSR space of the IRD 7.

The IRD 7 converts the received data into format B, and transmits it to the CSR space of the printer 6. Further, the IRD 7 instructs the printer 6 to perform printing by assuming the data of the specified CSR space to be in format B.

When conversion is not possible from the image format A supported by the disk apparatus 5 to the image format B supported by the printer 6, the IRD 7 tries conversion into a desired format via another controller on the network.

Specifically, when conversion from the format A into the format B is not supported, the IRD 7 searches for another controller (hereinafter referred to as a controller B) on the network. When the controller B is present, the IRD 7 acquires information of the format conversion table of the controller B, and checks whether conversion into a format in which transmission from the disk apparatus 5 to the printer 6 is possible by using the format conversion functions of the IRD 7 and the controller B. If the conversion is possible, format conversion is performed by using the functions of both the IRD 7 and the controller B or the functions of one of them, and data is transmitted from the disk apparatus 5 to the printer 6.

When desired format conversion cannot be performed even by using the conversion functions of the IRD 7 and the controller B, the IRD 7 searches for still another controller C, acquires information of the format conversion table supported by the controller C, and checks if desired format conversion can be performed by using the conversion functions of the IRD 7 and the controllers B and C, and if possible, performs format conversion.

In this way, a particular controller (in FIG. 4, the IRD 7) transmits data to the other controller, and the transmitted data is subjected to format conversion and is transmitted to the next controller. The controller, which has performed conversion into a format which can be received by the printer 6 finally, transmits the data to the printer 6, and any one of the controllers instructs the printer 6 to print data by assuming the data of the CSR space to be in format B.

When desired format conversion cannot be performed even by using all the controllers on the network or the number of controllers up to a limit for the implementation, the controller stops data transmission and returns an error code to the application that has instructed printing.

The specific example of the foregoing is a case in which the source apparatus is a disk apparatus, the destination apparatus is a printer, and the controller is an IRD. In addition to this, in the present invention, in a model in which a source apparatus having data to be transmitted and a destination apparatus that processes and holds data are connected, it is possible to perform format conversion and processing of data to be transmitted by a method similar to that described above.

An applicable model is shown below as an example.

(1) The source apparatus is a digital still camera, and the destination apparatus is a digital still camera.

In this case, as a data transmission source, an image memory provided in the digital still camera is conceivable, and as a data transmission destination, an image memory and a liquid-crystal display provided in the digital still camera are conceivable.

(2) The source apparatus is a camera-integrated video tape recorder or a video tape recorder, and the destination apparatus is a camera-integrated video tape recorder or a video tape recorder.

In this case, as a data transmission source, an image memory and a recording medium provided in the camera-integrated video tape recorder or the video tape recorder are conceivable, and as a data transmission destination, an image memory, a liquid-crystal display, and a recording medium provided in the camera-integrated video tape recorder or the video tape recorder are conceivable.

(3) The source apparatus is a facsimile apparatus or an image scanner.

As a data transmission source, a scanning buffer is conceivable.

(4) The destination apparatus is a facsimile apparatus, a digital copying machine, or the like.

As a data transmission destination, a print unit of the apparatus is conceivable.

(5) The destination apparatus is a disk apparatus.

As a data transmission destination, a recording medium is conceivable.

As has been described above in detail, according to the present invention, the advantages of (1) and (2) described below can be exhibited.

(1) When transmitting data from the source apparatus to the destination apparatus, differences in data formats which are supported can be overcome.

(2) When there are a number of formats for the data to be transmitted, the source and destination apparatuses need not support a number of formats for transmission of data, and a controller need only support a number of formats on a network, leading to reduced cost on the network scale.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An electronic apparatus on a communication network having a bus and a plurality of electronic apparatuses connected to the bus, said electronic apparatus comprising:

means for checking a list of transmittable data formats stored in a first electronic apparatus and a list of receivable data formats stored in a second electronic apparatus of said plurality of electronic apparatuses on said communication network;

determination means for determining whether a data format which can be transmitted by said first electronic apparatus can be received by said second electronic apparatus based on said list of transmittable data formats stored in said first electronic apparatus and said list of receivable data formats stored in said second electronic apparatus; and control means for instructing said second apparatus to receive and process data in said data format and for instructing said first electronic apparatus to transmit said data in said data format to said second electronic apparatus when it is determined by said determination means that said data format which can be transmitted by said first electronic apparatus can be received by said second electronic apparatus, wherein said means for checking, said determination means, and said control means are included in a third electronic apparatus.

2. The electronic apparatus according to claim 1, wherein said determination means includes first determination means, and further comprising:

holding means for holding information of a convertible data format;

second determination means for determining whether the data format which can be transmitted by said first electronic apparatus can be converted into a format which can be received by said second electronic apparatus based on the information of said data format; and data format conversion means for converting the data format which can be transmitted by said first electronic apparatus into the format which can be received by said second electronic apparatus when said first determination means determines that the data format which can be transmitted by said first electronic apparatus cannot be received by said second electronic apparatus and when said second determination means determines that the data format which can be transmitted by said first electronic apparatus can be received by said second electronic apparatus.

3. The electronic apparatus according to claim 2, further comprising:

acquisition means for acquiring the information of the convertible data format in a third electronic apparatus from among said plurality of electronic apparatuses;

third determination means for determining whether said third electronic apparatus can convert the data format which can be transmitted by said first electronic apparatus into the format which can be received by said second electronic apparatus based on the information of the convertible data format in said third electronic apparatus; and control means for controlling said third electronic apparatus to convert the data format which can be transmitted by said first electronic apparatus into the format which can be received by said second electronic apparatus when said first determination means determines that the data format which can be transmitted by said first electronic apparatus cannot be received by said second electronic apparatus, when said second determination means determines that the data format which can be transmitted by said first electronic apparatus cannot be converted into the format which can be received by said second electronic apparatus, and when said third determination means determines that the data format which can be transmitted by said first electronic apparatus can be converted into the format which can be received by said second electronic apparatus.

4. A data communication method on a communication network having a bus and a plurality of electronic apparatuses connected to the bus, said data communication method comprising the steps of:

acquiring a list of transmittable data formats stored in a source apparatus and a list of receivable data formats stored in a destination apparatus of said plurality of electronic apparatuses;

determining whether a data format which can be transmitted by said source apparatus can be received by said destination apparatus based on said list of transmittable data formats stored in said source apparatus and said list of receivable data formats stored in said second electronic apparatus; and performing control to instruct said destination apparatus to receive and process data in said data format and to instruct said source apparatus to transmit said data in said data format to said destination apparatus when it is determined that said data format which can be transmitted by said source apparatus can be received by said destination apparatus, wherein said steps of acquiring, determining, and performing are performed in a controller apparatus.

5. The data communication method according to claim 4, further comprising the steps of:

referencing information of a convertible data format when the data format which can be transmitted by said source apparatus cannot be received by said destination apparatus;

determining whether the data format which can be transmitted by said source apparatus can be converted into the data format which can be received by said destination apparatus based on said list of transmittable data formats and the information of said convertible data format; and performing control so that when it is determined that the data format which can be transmitted by said source apparatus can be received by said destination apparatus, the data format which can be transmitted by said source apparatus is converted into the data format which can be received by said destination apparatus.

* * * * *